United States Patent
Ikai et al.

(10) Patent No.: US 10,359,090 B2
(45) Date of Patent: Jul. 23, 2019

(54) COMPRESSION COIL SPRING AND METHOD FOR PRODUCING SAME

(75) Inventors: Kazuya Ikai, Fujisawa (JP); Tohru Shiraishi, Yokohama (JP); Yuichiro Ono, Yokohama (JP); Yoshiki Ono, Yokohama (JP)

(73) Assignee: NHK SPRING CO., LTD., Yokohama-shi (JP)

( * ) Notice: Subject to any disclaimer, the term of this patent is extended or adjusted under 35 U.S.C. 154(b) by 140 days.

(21) Appl. No.: 14/238,293

(22) PCT Filed: Jul. 26, 2012

(86) PCT No.: PCT/JP2012/068965
§ 371 (c)(1),
(2), (4) Date: Jun. 20, 2014

(87) PCT Pub. No.: WO2013/021828
PCT Pub. Date: Feb. 14, 2013

(65) Prior Publication Data
US 2014/0306389 A1    Oct. 16, 2014

(30) Foreign Application Priority Data
Aug. 11, 2011  (JP) .................. 2011-175520

(51) Int. Cl.
*C21D 9/02* (2006.01)
*C22C 38/02* (2006.01)
(Continued)

(52) U.S. Cl.
CPC .............. *F16F 1/021* (2013.01); *B21F 35/00* (2013.01); *B24C 1/10* (2013.01); *C21D 7/06* (2013.01);
(Continued)

(58) Field of Classification Search
CPC .. F16F 1/042; F16F 1/021; B21F 3/02; C22C 38/18; C22C 33/0264; C22C 33/0271; C22C 38/02; C22C 38/04; C21D 9/02
(Continued)

(56) References Cited

U.S. PATENT DOCUMENTS 4,578,124 A * 3/1986 Yutori .................. C21D 1/185
148/320
4,705,580 A   11/1987 Yamazaki
(Continued)

FOREIGN PATENT DOCUMENTS

CN    1768155 A    5/2006
JP    A-61-27133    2/1986
(Continued)

OTHER PUBLICATIONS

International Search Report issued in International Patent Application No. PCT/JP2012/068965 dated Oct. 16, 2012.
(Continued)

*Primary Examiner* — Bradley T King
*Assistant Examiner* — Stephen M Bowes
(74) *Attorney, Agent, or Firm* — Oliff PLC (57) ABSTRACT

A compression coil spring having high durability can be provided by using an inexpensive wire material. The present invention provides a compression coil spring formed by using a steel wire material, the steel wire material made of C: 0.45 to 0.85 mass %, Si: 0.15 to 2.5 mass %, Mn: 0.3 to 1.0 mass %, Fe and inevitable impurities as a remainder, and a circle-equivalent diameter of 1.5 to 9.0 mm, wherein hardness of a freely selected cross-section of the wire material is 570 to 700 HV, and at an inner diameter side of the coil spring, unloaded compressive residual stress at a depth of 0.2 mm from a surface in an approximate maximal main stress direction in a case in which compressive load is
(Continued)

loaded on the spring is 200 MPa or more, and unloaded compressive residual stress at a depth of 0.4 mm from surface is 100 MPa or more.

20 Claims, 2 Drawing Sheets

(51) Int. Cl.

| | |
|---|---|
| C22C 38/04 | (2006.01) |
| F16F 1/02 | (2006.01) |
| B21F 35/00 | (2006.01) |
| C21D 7/06 | (2006.01) |
| C21D 8/06 | (2006.01) |
| C22C 38/18 | (2006.01) |
| C22C 38/24 | (2006.01) |
| C22C 38/34 | (2006.01) |
| C22C 38/46 | (2006.01) |
| F16F 1/06 | (2006.01) |
| B24C 1/10 | (2006.01) |

(52) U.S. Cl.
CPC ............... *C21D 8/065* (2013.01); *C21D 9/02* (2013.01); *C22C 38/02* (2013.01); *C22C 38/04* (2013.01); *C22C 38/18* (2013.01); *C22C 38/24* (2013.01); *C22C 38/34* (2013.01); *C22C 38/46* (2013.01); *F16F 1/06* (2013.01); *C21D 2211/008* (2013.01)

(58) Field of Classification Search
USPC .................................................. 148/580, 908
See application file for complete search history.

(56) References Cited

U.S. PATENT DOCUMENTS

| | | | | |
|---|---|---|---|---|
| 4,909,866 | A * | 3/1990 | Abe | .......... C21D 7/06 148/333 |
| 6,193,816 | B1 | 2/2001 | Nakano et al. | |
| 6,224,686 | B1 * | 5/2001 | Aoki | .......... C21D 8/06 148/230 |
| 6,338,763 | B1 | 1/2002 | Hashimura et al. | |
| 6,475,306 | B1 * | 11/2002 | Kanisawa | .......... C21D 8/06 148/320 |
| 6,547,890 | B2 * | 4/2003 | Kanisawa | .......... C21D 8/06 148/320 |
| 6,790,294 | B1 * | 9/2004 | Ishida | .......... B24C 1/086 148/212 |
| 2004/0079067 | A1 | 4/2004 | Yoshikawa et al. | |
| 2005/0161131 | A1 | 7/2005 | Yoshikawa et al. | |
| 2006/0196584 | A1 * | 9/2006 | Kochi | .......... C22C 38/34 148/332 |
| 2006/0201588 | A1 * | 9/2006 | Suda | .......... C22C 38/02 148/333 |
| 2007/0074792 | A1 | 4/2007 | Vondracek et al. | |
| 2009/0174129 | A1 * | 7/2009 | Izumida | .......... C21D 7/06 267/167 |
| 2009/0277539 | A1 * | 11/2009 | Kimura | .......... C21D 8/0205 148/504 |
| 2010/0090384 | A1 * | 4/2010 | Fenioux | .......... F16F 1/042 267/166 |
| 2010/0320662 | A1 | 12/2010 | Tange et al. | |
| 2011/0074076 | A1 | 3/2011 | Kuno et al. | |
| 2011/0074077 | A1 | 3/2011 | Kuno et al. | |
| 2011/0074078 | A1 | 3/2011 | Nakano et al. | |
| 2011/0074079 | A1 | 3/2011 | Nakano et al. | |
| 2012/0047741 | A1 | 3/2012 | Jung | |
| 2012/0193848 | A1 * | 8/2012 | Kato | .......... F16F 1/042 267/166 |

FOREIGN PATENT DOCUMENTS

| | | |
|---|---|---|
| JP | S62-050028 | 3/1987 |
| JP | A-5-179348 | 7/1993 |
| JP | A-11-241143 | 9/1999 |
| JP | A 2003-55741 | 2/2003 |
| JP | 2003166034 A * | 6/2003 |
| JP | B2-3595901 | 12/2004 |
| JP | A-2006-522214 | 9/2006 |
| JP | A-2009-226523 | 10/2009 |
| JP | A-2011-664 | 1/2011 |
| JP | 2011-149036 A | 8/2011 |
| KR | 10-2011-0021702 | 3/2011 |
| WO | WO 2010/134657 A1 | 11/2010 |
| WO | WO-2010/146907 A1 | 12/2010 |

OTHER PUBLICATIONS

Written Opinion of the International Searching Authority issued in International Patent Application No. PCT/JP2012/068965 dated Oct. 16, 2012.
May 4, 2015 Office Action issued in Chinese Patent Application No. 201280039282.5.
May 20, 2016 Search Report issued in European Patent Application No. 12822031.6.
Jun. 7, 2018 Office Action issued in Korean Patent Application No. 10-2014-7004873.

* cited by examiner

Fig. 1A

(Hot forming method)

Fig. 1B

(Cold forming method)

Fig. 1C

(Cold forming method)

Fig. 1D

(Cold forming method)

COMPRESSION COIL SPRING AND METHOD FOR PRODUCING SAME

TECHNICAL FIELD

The present invention relates to a compression coil spring for use in an engine and clutch of a vehicle, for example, and in particular, relates to a compression coil spring which exhibits superior fatigue resistance even in environments of high stress, and relates to a method for producing the same.

BACKGROUND ART

In recent years, it has been progressively required to reduce the fuel consumption of vehicles in view of environmental problems, and reduction in size and weight of parts for vehicles has been also severely required more than ever. To satisfy the requirements for reduction in size and weight, research on strengthening of materials and surface strengthening by a surface treatment have been actively performed in the field of compression coil spring parts such as a valve spring used in an engine or a clutch torsion spring used in a clutch, for example. As a result, fatigue resistance and settling resistance, which are important properties in a coil spring, have been improved.

Figure 1A:
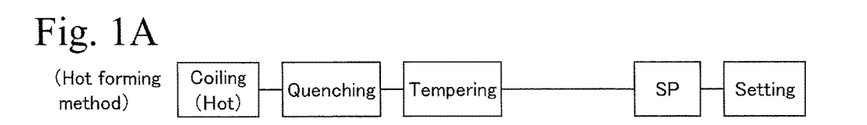
FIG. 1 is a diagram showing one example of a process for production of a coil spring.

Generally, a process for production of a coil spring is broadly classified as a hot forming method or a cold forming method. The hot forming method is employed in forming a coil spring in which cold forming is difficult due to low workability, such as in a case in which wire diameter d is large, and spring index D/d, which is a ratio of coil average diameter D and wire diameter d, is low. As such a coil spring material, carbon steel and spring steel are mentioned. In the hot forming method, as shown in FIG. 1A, a wire material is heated to high temperature so that the material is easily processed, the wire material is coiled around a core metal so that the material forms the shape of a coil spring, the coil spring is quenched and tempered, and furthermore, shotpeening and setting are performed, so as to obtain fatigue resistance and settling resistance, which are important as properties of a coil spring. In the hot forming method, it should be noted that coiling without using a core metal has not been realized because it is technically very difficult. Therefore, it is necessary to use the core metal in the hot forming method conventionally, and compared to the cold forming method in which coiling is possible without the core metal, a coil spring which can be formed by the hot forming method has a lower degree of freedom in shape.

On the other hand, regarding a coil spring which has a shape which can be formed by the cold forming method due to its comparatively large spring index or comparatively thin wire diameter, the cold forming method has been generally employed from a viewpoint of an easiness of processing technique and a property of mass-production due to processing rate and facility cost (takt time, size accuracy, cost). In addition, as one of the main reasons why the cold forming method is employed, a forming technique without using a core metal is established and the degree of freedom in forming a coil spring is large. In the cold forming method, a hard-drawn wire such as carbon steel wire, hard steel wire, piano wire, and spring steel wire have been used as a spring material. However, strengthening of material has been required from the viewpoint of reducing weight in recent years, and an oil temper wire, which is expensive, is progressively widely used.

Figure 1B:
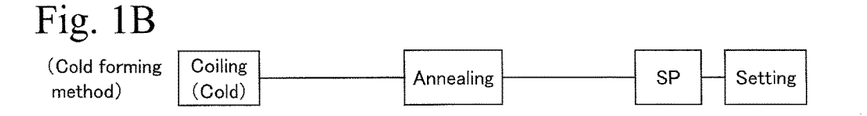
Figure 1C:
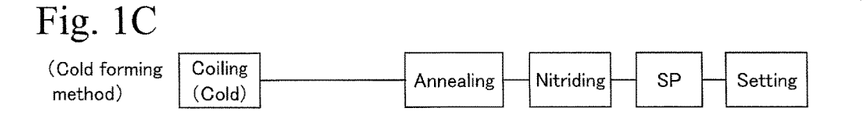
Figure 1D:
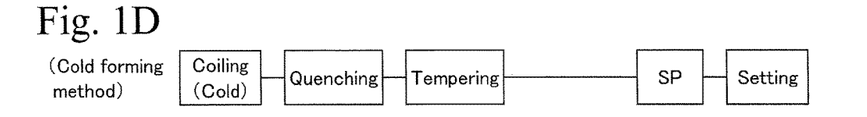

In the cold forming method, as shown in FIGS. 1B and 1C, a wire material is coiled to a coil spring shape in a cold condition, it is annealed, and then shotpeening and setting are performed, if necessary. Here, the annealing has a purpose of removing residual stress, which has been generated by a processing and which may become disincentive to improve fatigue resistance of a coil spring. In addition, the annealing contributes to improving fatigue resistance of a coil spring together with giving of compressive residual stress to a surface by shotpeening. It should be noted that a surface hardening treatment such as nitriding treatment is performed before shotpeening, if necessary, in a coil spring which is to be used under high load stress, such as valve spring or clutch torsion spring.

Extensive research to further improve fatigue resistance has been performed. For example, in the Patent Document 1 below, an oil temper wire for cold forming is disclosed, and furthermore, a technique to improve fatigue resistance by using a processing-induced transformation of residual austenite is disclosed. In the Patent Document 2, a technique is disclosed in which multi-step shotpeeing at different projecting rates is performed against a surface of wire material on which nitriding is performed so as to give large compressive residual stress and improved fatigue resistance.

In the Patent Document 1, residual stress is generated in the coil spring after coiling. This residual stress, in particular a tensile residual stress of a wire axis direction that is generated in a surface of an inner diameter side of a coil, is one of the disincentives against improving fatigue resistance as a coil spring. Ordinarily, annealing is performed so as to remove residual stress due to this processing. However, those skilled in the art already know or can easily assume that it is difficult to completely remove this residual stress while maintaining strength of the wire material, even with the wire material disclosed in the Patent Document 1 which has high tempering softening resistance. Therefore, it is difficult to give sufficient compressive residual stress to a wire material surface due to influence of tensile residual stress generated at an inner diameter side of a coil by processing, and therefore sufficient fatigue resistance as a coil spring cannot be obtained, even if shotpeening is performed thereafter. Furthermore, an element such as V or Mo, which contributes to improving tempering softening resistance, is expensive. Therefore, a wire material may be extremely expensive, and a coil spring as a product may also be expensive as an inevitable result.

In addition, the Patent Document 2 discloses that compressive residual stress around the proximity of wire material surface (hereinafter referred to as "surface") of coil spring is about 1400 MPa, and that this compressive residual stress is sufficient to avoid generating of cracking at the surface as a coil spring used under high load stress in a class of valve spring or clutch torsion spring. However, as a result of improving compressive residual stress of the surface, compressive residual stress inside of the wire material becomes low, and therefore, the effect of the compressive residual stress becomes poor against cracking generation inside of the wire material which starts and spreads from inclusions or the like. That is, by the method of the Patent Document 2, there is a limitation in energy given by shotpeening, although variation can be given to a distribution of compressive residual stress; however, it is difficult to greatly improve the total overall compressive residual stress. In the Patent Document 2, it is not considered to solve the influence of residual stress by the processing mentioned above, and therefore, the effect of improving fatigue strength against wire material having the same strength is poor.

It should be noted that various means for improving surface compressive residual stress have been realized, and as a result, in a coil spring having a wire diameter from about 1.5 to 9.0 mm for example, the maximal value of combined stress which is a sum of applied stress and residual stress by an outer load is in a range of depth from the wire material surface (hereinafter referred to as "depth") of 0.1 to 0.4 mm, and a portion in which the combined stress is greatest is the origin of breaking. Therefore, it is important to keep large compressive residual stress in the range of depth of 0.1 mm to 0.4 mm to obtain fatigue resistance.

Furthermore, as a method in which residual stress generated during coiling process in the cold forming method is almost completely solved and desired strength as the wire material is maintained, a method in which a coil spring after cold forming is heated to an austenite region and then quenched and tempered, can be mentioned. However, in this case, it is difficult to uniformly heat a coil having spring shape in a short time. As a result, irregular structure may be generated, that is, there may be portions having low strength existing, and it may become difficult to obtain desired fatigue resistance, and also difficult to maintain reliability as a product.

Here, a longer heating time is effective as a method to heat uniformly; however, since crystal particles would be coarsened in that case, fatigue resistance may be deteriorated. Furthermore, large processing strain remains in a coil spring after cold forming, and the amount of the remaining processing strain is not uniform in one coil spring, and it may greatly vary among multiple coil springs. As a result, when the processing strain is reduced by heating, the shape may vary greatly and non-uniformly, and the variation in shape among the multiple springs may also be inevitably great. Therefore, in a valve spring or clutch torsion spring or the like for example, it may be difficult to maintain required size accuracy, and it is difficult to apply such reducing means of residual stress by heating, to a mass-production.

The Patent Documents are as follows.
Patent Document 1: Japanese Patent No. 3595901
Patent Document 2: Japanese Unexamined Patent Application Publication No. 2009-226523

As mentioned above, in view of requirements for both further improvement of fatigue resistance under high stress and cost reduction in recent years, a conventional method for production and techniques disclosed in the Patent Documents 1 and 2 and the like are not sufficient solutions and have difficulties. Furthermore, an oil tempered wire, which has been mainly used for cold forming, is expensive, and in particular, an oil tempered wire to which an expensive element such as Ni, V, and Mo has been added is extremely expensive. Furthermore, since residual stress by processing has not been completely solved by annealing treatment after forming, performance of the wire material has not been utilized sufficiently.

SUMMARY OF THE INVENTION

In view of above-mentioned circumstances, an object of the present invention is to provide a compression coil spring and a method for producing same in which generation of residual stress by coiling processing is avoided and high durability is obtained using an inexpensive wire material by giving appropriate compressive residual stress distribution to wire material after forming.

The inventors have researched about fatigue resistance of a coil spring. As a result, they have found that although residual stress that is generated by processing can be reduced to some extent by controlling of steel components by adding expensive elements, which improves tempering softening resistance, or by controlling annealing conditions thereafter; however, it is fundamentally difficult to completely solve the residual stress problem by the processing while maintaining steel strength required for fatigue resistance and settling resistance against load stress. Then, they have also found that effects of shotpeening and setting that are performed subsequently can be effectively obtained, by producing a coil spring while restraining generation of residual stress during processing by performing coiling processing while heating the coil spring wire material in the austenite region.

Furthermore, in the heating step to the austenite region, a shorter heating time may be brought into restraining of coarsening of prior austenite crystal particle diameter (hereinafter referred to as "crystal particle diameter") or may be brought into miniaturization. Furthermore, this crystal particle diameter has a close relationship with fatigue resistance, and miniaturization of crystal particles is effective for improving fatigue resistance. Therefore, by hot-processing using the wire material heated in a short time, residual stress caused by processing can be prevented from being generated, and thus, it becomes possible to produce a spring having superior fatigue resistance.

That is, the compression coil spring of the present invention is formed by using a steel wire material consisting of C: 0.45 to 0.85 mass %, Si: 0.15 to 2.5 mass %, Mn: 0.3 to 1.0 mass %, Fe and inevitable impurities as a remainder, and a circle-equivalent diameter of 1.5 to 9.0 mm, in which hardness of a freely selected cross-section of the wire material is 570 to 700 HV, and at an inner diameter side of the coil spring, unloaded compressive residual stress at a depth of 0.2 mm from the surface is 200 MPa or more in an approximate maximal main stress direction in a case in which compressive load is loaded on the spring, and unloaded compressive residual stress at a depth of 0.4 mm from surface is 100 MPa or more. Here, the "approximate maximal main stress direction in a case in which compressive load is loaded on the spring" means approximately +45° direction against the axial direction of the wire material. Furthermore, this maximal main stress direction may vary depending on coil spring shape (in particular, relationship with pitch angle), and the direction can exist in a range of +45° to +60° relative to the axial direction.

Furthermore, the compression coil spring of the present invention is formed by using a steel wire material consisting of C: 0.45 to 0.85 mass %, Si: 0.15 to 2.5 mass %, Mn: 0.3 to 1.0 mass %, Fe and inevitable impurities as a remainder, and a circle-equivalent diameter of 1.5 to 9.0 mm, in which hardness of a freely selected cross-section of the wire material is 570 to 700 HV, and at inner diameter side of the coil spring, $I_{oR}$ is 180 MPa·mm or more. Here, the $I_{oR}$ means an integral value of unloaded compressive residual stress from the surface to a crossing point in a relationship diagram of depth and residual stress. It should be noted that the crossing point means a depth at which the compressive residual stress from the surface in a case of unloaded becomes 0, and a larger crossing point suggests that the compressive residual stress exists deeper from the surface. Furthermore, the compressive residual stress is one in the approximate maximal main stress direction in a case in which compressive load is loaded on the spring, that is, an approximately +45° direction against the axial direction of the wire material.

Reason for limitation of value range defined in the present invention is explained as follows. First, reason for limitation of the chemical component of the steel wire material used in the present invention is explained. In the present invention, a steel wire material containing C: 0.45 to 0.85 mass %, Si: 0.15 to 2.5 mass %, Mn: 0.3 to 1.0 mass %, and Fe and inevitable impurities as a remainder, is used. It should be noted that "%" in the following means "mass %".

(1) Material Component

C: 0.45 to 0.85%

C contributes to improved strength. In a case in which content of C is less than 0.45%, since the effect of improving strength is not sufficient, fatigue resistance and settling resistance may become insufficient. On the other hand, in a case in which content of C is more than 0.85%, toughness is deteriorated and cracking may easily occur. Therefore, the content of C is 0.45 to 0.85%.

Si: 0.15 to 2.5%

Si is effective for deoxidation of steel while contributing to improvement of strength and tempering softening resistance. In a case in which content of Si is less than 0.15%, these effects cannot be obtained sufficiently. On the other hand, in a case in which content of Si is more than 2.5%, toughness is deteriorated and cracking may easily occur, while bringing into promoting decarburization and deterioration of surface strength of a wire material. Therefore, the content of Si is 0.15 to 2.5%.

Mn: 0.3 to 1.0%

Mn contributes to improve quenching property. In a case in which content of Mn is less than 0.3%, it may become difficult to maintain sufficient quenching property, and effect of fixation of S (generation of MnS), which is harmful for ductility and toughness, may become poor. On the other hand, in a case in which content of Mn is more than 1.0%, ductility is deteriorated and cracking or surface damage may easily occur. Therefore, the content of Mn is 0.3 to 1.0%.

These added elements are the minimum required elements, and other elements can be added. That is, in the present invention, it is possible to add one or more selected from Cr, B, Ni, Ti, Cu, Nb, V, Mo, and W or the like which are generally used as components in the composition of spring steel in a range of 0.005 to 4.5%, if necessary, according to the purpose. As a result, it becomes possible to produce a coil spring having superior performance, or a coil spring appropriate for a purpose. For example, a case in which Cr is added is explained as follows.

Cr: 0.5 to 2.0%

Cr is effective for preventing decarburization, while contributing to improving strength and tempering softening resistance, and fatigue resistance. Furthermore, it is also effective for improving of settling resistance in hot conditions. Therefore, in the present invention, it is desirable to add Cr in a range of 0.5 to 2.0%. In a case in which content of Cr is less than 0.5%, these effects cannot be obtained sufficiently. On the other hand, in a case in which content of Cr is more than 2.0%, toughness may be deteriorated and cracking and surface damage may easily occur.

(2) Hardness

As the valve spring or clutch torsion spring or the like which are used under high load stress, in order to satisfy required fatigue resistance and settling resistance, strength of the wire material itself is also important in addition to the below-mentioned compressive residual stress distribution as a coil spring. That is, it is necessary that average Vickers hardness on a freely selected cross section of the wire material be in a range of 570 to 700 HV. In a case in which hardness is less than 570 HV, sufficient fatigue resistance and settling resistance cannot be obtained since the material strength is low. On the other hand, in a case in which hardness is more than 700 HV, since notch sensitivity may be increased accompanied by decreasing of toughness, there is a risk of early breakage due to cracking generation which starts and spreads from surface damage due to friction with tools when coiling, or from a concave portion of surface roughness of wire material formed by shotpeening. Thus, this may be unsuitable for parts for vehicles in which high reliability is important.

(3) Residual Stress

The inventors examined breakage mechanical calculations in a relationship between applied stress required in a valve spring or a clutch torsion spring and various causes which can be a source of fatigue breakage (ductility and toughness, non-metal type inclusions, abnormal structure such as incomplete quenched structure or the like, surface roughness, surface damage or the like), and examined actual durability test. Furthermore, based on the result of the examination, the inventors have reached the following conclusion about compressive residual stress required around the vicinity of the surface of the wire material of a coil spring. It should be noted that the compressive residual stress in the present invention is one in the approximate maximal main stress direction in a case in which compressive load is loaded on the spring, that is, +45° direction relative to the axial direction of the wire material.

The compressive residual stress distribution from the wire material surface to the inside of the spring is given by the shotpeening and setting. As mentioned above, in order to improve fatigue resistance as a spring, it is necessary to introduce the compressive residual stress inside greater and deeper as well as to improve compressive residual stress of the wire material surface. In particular, it is important to further increase the compressive residual stress in a range of depth of about 0.1 to 0.4 mm, which is substantially the source of breaking. As an index showing the compressive residual stress distribution inside of the wire material, compressive residual stress when unloaded at a depth of 0.2 mm is 200 MPa or more, and compressive residual stress when unloaded at a depth of 0.4 mm is 100 MPa or more. In a case in which at least one of unloaded compressive residual stress at the position of depth of 0.2 mm is less than 200 MPa and unloaded compressive residual stress at the position of depth of 0.4 mm is less than 100 MPa, it is insufficient to restrain fatigue breaking of an inner origin point.

Furthermore, the $I_{\sigma R}$, which is another index showing the extent or depth of compressive residual stress inside, is 180 MPa·mm or more. Furthermore, the crossing point, which is another index, is desirably a depth from the surface 0.45 mm or more in a case in which wire material having a wire diameter of 1.5 to 9.0 mm is used, for example. In all cases, it is desirable that the maximal compressive residual stress, when unloaded, at the surface of inner diameter side of the spring, be 850 MPa or more, in a case of a valve spring or a clutch torsion spring in which heavy load stress is applied. By determining compressive residual stress distribution in this way, a compressive coil spring having superior fatigue resistance can be obtained.

It is desirable that the compressive residual stress distribution of the present invention be formed by shotpeening treatment and setting treatment performed after the shotpeening. When multi-step shotpeening is performed in the shotpeening treatment, it is desirable that sphere-equivalent diameter of shot used in a latter shotpeening be smaller than sphere-equivalent diameter of shot used in a previous shotpeening. In practice, it is desirable that the shotpeening treatment be a multi-step shotpeening consisting of a first shotpeening by shot of particle diameter 0.6 to 1.2 mm, a second shotpeening by shot of particle diameter 0.2 to 0.8 mm, and a third shotpeening by shot of particle diameter 0.02 to 0.30 mm. By this treatment, surface roughness, which is increased by a former shotpeening step, can be reduced by a later shotpeening step.

It should be noted that diameter and material of the shot used and the number of steps are not limited as mentioned above, and they can be freely varied in order to obtain necessary residual stress distribution and surface roughness or the like depending on required performance. In addition, since compressive residual stress distribution that is introduced is varied depending on injecting rate and injecting time, they are also set based on requirements.

(4) Coil Spring Shape

The present invention is appropriate for a compression coil spring having properties mentioned as follows, in which degree of processing during coiling is large and both high fatigue resistance and high settling resistance are required. The present invention can be applied to a compression coil spring generally formed by cold forming, having circle-equivalent diameter (diameter of a circle that is calculated from cross-sectional area of wire material while assuming it to be a circle, and it includes non-circular cross section, such as polygonal shape, oval shape or the like) of 1.5 to 10 mm and having a spring index of 3 to 20.

In particular, the present invention is appropriate for a compression coil spring having a circle-equivalent diameter of 1.5 to 9.0 mm and spring index of 3 to 8, which is used as a valve spring, clutch torsion spring or the like in which degree of processing during coiling is large (that is, tensile residual stress of inner diameter side of the coil which is generated during coiling is large in the cold forming) and high fatigue resistance is required.

In addition, differing from a conventional hot forming method, since a coil spring forming apparatus mentioned below is used, a core metal is not necessary in coiling processing of the present invention. Therefore, there is a high degree of freedom in spring shape that can be formed. That is, as a coil spring shape of the present invention, as well as a typical cylindrical shape in which coil outer diameter is almost even in the entire circumference, other shapes can be selected. For example, a deformed shape spring such as conical shape, bell shape, drum shape, barrel shape or the like can be formed by the present invention.

(5) Surface Roughness

As the valve spring, a clutch torsion spring or the like that are used under high load stress, in order to satisfy required fatigue resistance, surface roughness is also important in addition to the above-mentioned compressive residual stress distribution. As a result of the inventors' mechanical breaking calculation and examination experiments thereof, it has become obvious that regarding occurring and spreading of cracking by surface origin, the effect can be rendered harmless by making depth of surface damage (that is, surface roughness $R_z$ (maximal height)) 20 µm or less. Therefore, it is desirable that the surface roughness $R_z$ be 20 µm or less. In a case in which $R_z$ is more than 20 µm, a concave part of the surface roughness may become a source at which stress concentrates, and cracking may easily occur and spread from the concave part as a surface origin, and thus, the spring may break prematurely.

(6) Average Crystal Particle Size of Prior γ (Austenite) Crystal Particle

A method for measuring the average crystal particle size of the prior γ crystal particle is defined by JIS (Japanese Industrial Standard) G0551, and it is desirable that the prior γ average crystal particle size number G be 10 or more in order to improve fatigue resistance. In this case, since slipping migration can be prevented in the stress concentrating part at a top of fatigue cracking by fine prior γ crystal particles, the cracking may be prevented from spreading, and thus desired fatigue resistance can be obtained. In a case in which the number is less than 10, since the effect of restraining cracking spreading is poor, it may become difficult to obtain sufficient fatigue resistance.

(7) Average Crystal Particle Diameter

It is desirable that the average crystal particle diameter by IPF Map (interface having azimuth angle difference 5° or more is defined as a particle interface) using an SEM/EBSD (Electron Back Scatter Diffraction) method is 1 µm or less. In a case in which the average crystal particle diameter is more than 1 µm, it may become difficult to obtain sufficient fatigue resistance. Furthermore, a smaller average crystal particle diameter, that is, a finer block and lath in the prior γ particle is appropriate for improving fatigue resistance since it has large resistance against the spreading of cracking.

Furthermore, it is desirable that the compression coil spring of the present invention be produced by a subsequent coil forming apparatus and then be processed by shotpeening treatment. The apparatus desirably comprises a feed roller continuously supplying steel wire material, a coiling part forming the steel wire material into a coil shape, a cutting means for cutting and separating the steel wire material continuously supplied from the back after the steel wire material is coiled a predetermined number of times, wherein the coiling part comprising a wire guide guiding the steel wire material supplied by the feed roller to an appropriate position, a coiling tool consisting of a coiling pin or a coiling roller to form the steel wire material supplied via the wire guide to a coil shape, and a pitch tool for giving pitch, and the apparatus further includes a heating means for heating the steel wire material to austenite region within 2.5 seconds between exit of the feed roller and the coiling tool.

In the compression coil spring of the present invention, it is desirable that the heating means be a high-frequency heating, and the high-frequency heating coil be arranged so as to be concentric with the steel wire material on a passing route of the steel wire material inside of the wire guide, or on a passing route of the steel wire material in a space between an exit side terminal of steel wire material of the wire guide and the coiling tool. It should be noted that heating can be performed by energizing heating or laser heating instead of high frequency heating, as long as the steel wire material can be heated to an austenite region in a short time.

A method for production of compression coil spring of the present invention includes a coiling step for forming steel wire material by a following coil forming apparatus, the apparatus including a feed roller continuously supplying steel wire material, a coiling part forming the steel wire material into coil shape, and a cutting means for cutting and separating the steel wire material continuously supplied from the back after the steel wire material is coiled a predetermined number of times, the coiling part comprising a wire guide guiding the steel wire material supplied by the feed roller to an appropriate position, a coiling tool consisting of a coiling pin or a coiling roller to form the steel wire material supplied via the wire guide to a coil shape, and a pitch tool for giving pitch, the apparatus further including a heating means for heating the steel wire material to an austenite region within 2.5 seconds between exit of the feed roller and the coiling tool, the method further includes a quenching step of quenching the coil as it is, which is coiled, cut and separated and is still in an austenite region temperature, a tempering step for thermally refining the coil, a shotpeening step for giving compressive residual stress to the wire material surface, and a setting step, in this order.

In the present invention, the tempering process is performed to refine the coil that is hardened by the quenching process to a coil having appropriate hardness and toughness. Therefore, in a case in which desired hardness and toughness can be obtained only by quenching, the tempering process can be omitted. Furthermore, in the shotpeening process, the multi-step shotpeening can be performed, and furthermore, a low temperature aging treatment having a purpose of recovery of surface elasticity limit can be combined therewith, if necessary. Here, the low temperature aging treatment can be performed after the shotpeening process, or in an interval between each of the steps of the multi-step shotpeening. In a case in which shotpeening by shot having a particle diameter of 0.02 to 0.30 mm is performed as the last step of the multi-step shotpeening, it is desirable that the aging treatment be performed before the last shotpeening step from the viewpoint of further increasing of compressive residual stress on the outermost surface. It should be noted that several methods such as cold setting, hot setting or the like can be mentioned as a setting that is performed to prevent settling in the setting process, the method is appropriately selected depending on desired property.

By performing hot coiling by the coil spring forming apparatus, residual stress by processing can be prevented from being generated. Furthermore, since the temperature of the steel wire material reaches an austenite region within 2.5 seconds, crystal particles can be prevented from becoming coarse, and superior fatigue resistance can be obtained. Furthermore, since hot coiling is performed, superior fatigue resistance can be obtained without performing surface strengthening treatment such as nitriding treatment, and thus, production cost can be reduced.

The present invention can be applied to a hard drawn wire such as carbon steel wire, hard steel wire, piano wire and spring steel wire, and an oil tempered wire such as carbon steel oil tempered wire, chromium vanadium steel oil tempered wire, silicon chromium steel oil tempered wire and silicon chromium vanadium steel oil tempered wire, which are used as spring material. In particular, it is desirable to apply it to an inexpensive hard drawn wire. This is because since high frequency heating is performed in the hot forming in the present invention, a spring having fatigue resistance superior to a conventional cold formed spring in which expensive oil tempered wire using expensive elements is used can be produced, even by using an inexpensive wire material.

In the present invention, by giving appropriate compressive residual stress to a wire material, a compression coil spring having high durability can be obtained by using inexpensive wire material.

EXPLANATION OF REFERENCE NUMERALS

Figure 2:
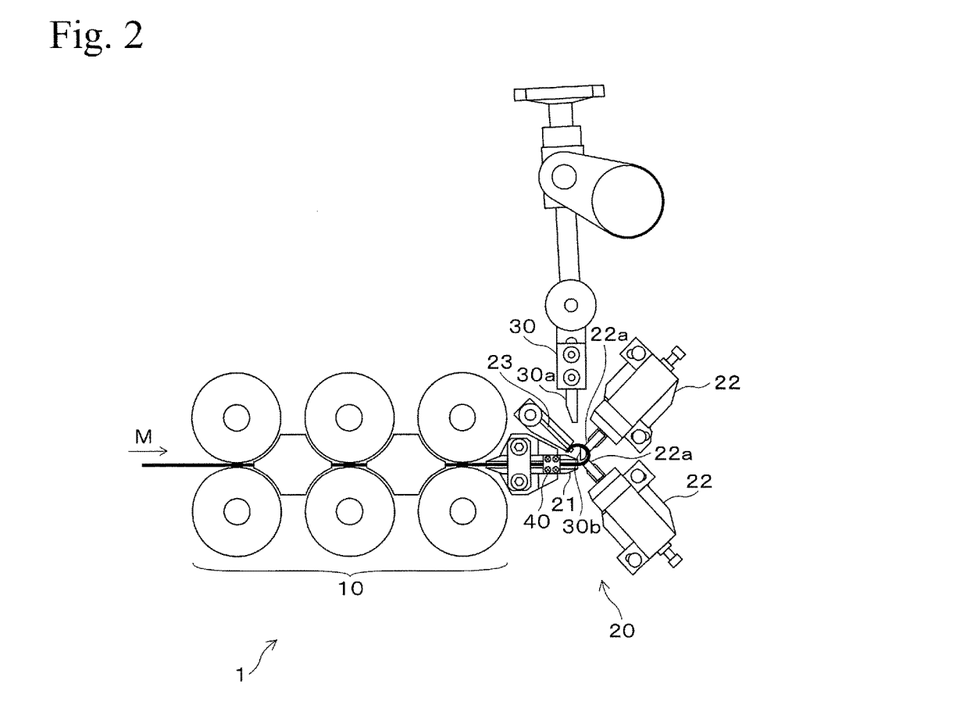
FIG. 2 is a schematic diagram showing a forming part of a coiling apparatus in an embodiment of the present invention.
Figure 3:
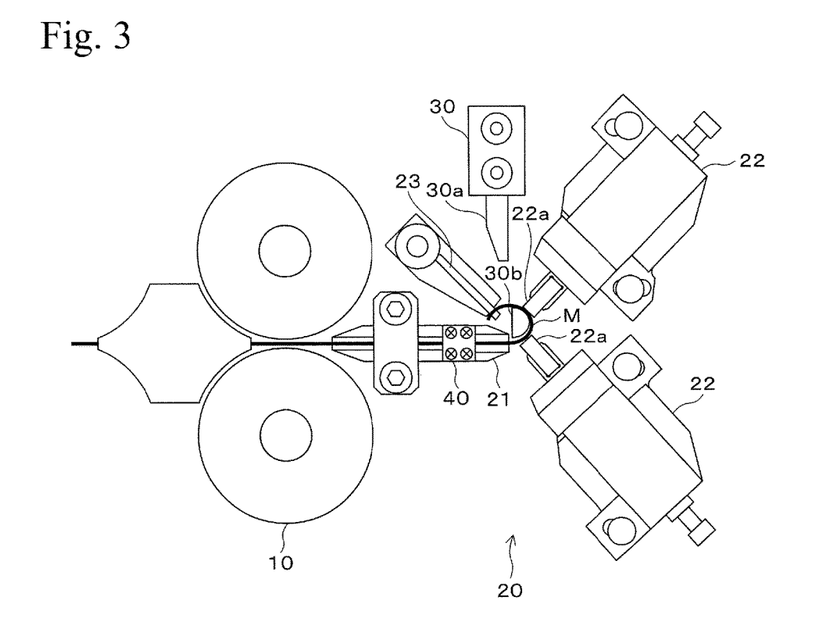
FIG. 3 is a schematic diagram showing a position of arranging a high frequency heating coil in an embodiment of the present invention.

1: Forming part of coiling apparatus, 10: Feed roller, 20: Coiling part, 21: Wire guide, 22: Coiling tool, 22*a*: Coiling pin, 23: Pitch tool, 30: Cutting means, 30*a*: Cutting blade, 30*b*: Inner mold, 40: High frequency heating coil, M: Steel wire material Embodiments of the Invention Embodiments of the present invention are practically explained as follows. In the present invention, in order to heat during coiling, a hot forming method as shown in FIG. 1A is used. In this Embodiment, steel wire material is supplied to a coiling machine by a wire feeding machine, and after heating the steel wire material rapidly in the coiling machine, the steel wire is formed in a coil shape, quenched in a quenching vessel, and further tempered.

FIG. 2 shows a schematic view of a forming part of the coiling machine. As shown in FIG. 2, the coiling machine forming part 1 includes a feed roller 10 supplying the steel wire material M continuously, a coiling part 20 forming the steel wire material M into a coil shape, a cutting means 30 consisting of a cutting blade 30*a* for cutting and separating the steel wire material M continuously supplied from the back after being coiled predetermined number of times and an inner mold 30*b*, and a high frequency heating coil 40 heating the steel wire material M between exit of the feed roller 10 and coiling tool 22. The coiling part 20 includes a wire guide 21 guiding the steel wire material M that is supplied by the feed roller 10 to an appropriate position, a coiling tool 22 consisting of a coiling pin (or coiling roller) 22*a* forming the steel wire material M that is supplied via the wire guide 21 to a coil shape, and a pitch tool 23 for giving pitch.

The rapid heating in the coiling machine is performed by a high frequency heating coil 40, and the temperature of the steel wire material is increased to the austenite region within 2.5 seconds. FIG. 3 shows a position of arranging the high frequency heating coil. The high frequency heating coil 40 is arranged near the wire guide 21, and the coiling part 20 is arranged so that forming can be done rapidly after heating the steel wire material M. It should be noted that the arranging position of the high frequency heating coil can be at positions other than the position shown in this Embodiment, as long as the steel wire material M can be formed rapidly after it is heated.

In the coiling part 20, the steel wire material M which passes through the wire guide 21 is contacted with the coiling pin 22*a* so as to be bent at predetermined curvature, and is further contacted to the coiling pin 22*a* downstream so as to be bent at a predetermined curvature. Then, the steel wire material M is contacted with the pitch tool 23 so as to give a pitch to form a desired coil shape. When the number of turns reaches a desired number, the cutting blade 30*a* of the cutting means 30 cuts the wire material at a position between the coiled part and a linear part of the inner mold 30*b* by shear, so that the steel wire material M supplied from the back and the steel wire material M of the spring shape are cut and separated.

First, the steel wire material M of which the circle-equivalent diameter is 1.5 to 9.0 mm and containing C: 0.45 to 0.85 mass %, Si: 0.15 to 2.5 mass %, Mn: 0.3 to 1.0 mass % and Fe and inevitable impurities as a remainder is prepared. This steel wire material M is supplied to the feed roller 10 by the wire feeding machine (not shown in the figure). After the steel wire material M is heated to the austenite region within 2.5 seconds by the high frequency heating coil 40, coiling is performed at the coiling part 20 (coiling process).

Next, the coil that is cut and separated after coiling and is still at the temperature of the austenite region is quenched (as a quenching solvent, oil heated at about 60° C. for example) in the quenching vessel (not shown in figure) as it is (quenching process), and is further tempered (tempering process, at 200 to 450° C. for example). By performing quenching, the structure becomes a highly hard structure consisting of a martensite structure, and by performing tempering further, the structure can be a tempered martensite structure having superior toughness. Here, a generally known method can be employed as the quenching and tempering treatment, and heating temperature of the wire material before the quenching, the kind and temperature of the quenching solvent, and temperature and time of tempering can be freely selected depending on the nature of the steel wire material M.

Furthermore, by performing the shotpeening treatment (shotpeening process) and setting treatment (setting process) of the steel wire material M, desired fatigue resistance can be obtained. Since coiling is performed while heating to the austenite region, residual stress by processing can be prevented from being generated. Therefore, compared to a conventional coil spring produced by the cold forming method, the coil spring of the present invention easily gains compressive residual stress by shotpeening, and it can effectively gain deep and large compressive residual stress from the surface at an inner diameter side of the spring. Furthermore, by performing setting treatment, a deeper compressive residual stress distribution is formed in the maximal main stress direction in the case in which it is used as a spring, and thus fatigue resistance can be improved.

In this embodiment, the multi-step shotpeening treatment consisting of the first shotpeening treatment by the shot of particle diameter of 0.6 to 1.2 mm, the second shotpeening treatment by the shot of particle diameter of 0.2 to 0.8 mm, and the third shotpeening treatment by the shot of particle diameter of 0.02 to 0.30 mm is performed. Since the smaller shot is used in the latter shotpeening treatment compared to that in the former shotpeening treatment, surface roughness of the wire material can be minimal.

As the shot used in the shotpeening, steel cut wire, steel beads, very hard particles such as FeCrB type or the like can be mentioned. Furthermore, the compressive residual stress can be controlled depending on sphere-equivalent diameter, injecting rate, injecting time of the shot, and injecting method of multiple steps.

Furthermore, in the present Embodiment, hot setting is performed as the setting treatment, heating is performed at 100 to 300° C., and plastic strain is given to the steel material of spring shape so that shear strain amount acting on the wire material surface exceeds shear strain amount at applied stress in a case in which it is practically used as a spring.

The compression coil spring of the present invention that is produced by the above-mentioned processes has a hardness of 570 to 700 HV at a freely selected cross-section of the wire, unloaded compressive residual stress of 200 MPa or more at a depth of 0.2 mm from surface, and unloaded compressive residual stress of 100 MPa or more at a depth of 0.4 mm from surface, at inner diameter side of the spring. Therefore, the compression coil spring of the present invention exhibits superior fatigue resistance.

EXAMPLES

Evaluation of Coiling Property

First, coiling property was evaluated by using a coiling machine (see FIGS. 2 and 3) having a high frequency heating coil. Oil tempered wires, each of them having a wire diameter of 1.0 to 10.0 mm and having chemical component shown in Table 1, were prepared, and they were coiled while heating the wire material at 900° C. by the coiling machine. Coiling was performed under combined conditions of wire diameter d and spring index D/d shown in Table 2.

TABLE 1

| C | Si | Mn | Cr (wt %) |
|---|----|----|-----------|
| 0.51 to 0.59 | 1.20 to 1.60 | 0.50 to 0.80 | 0.50 to 0.80 |

TABLE 2

| Samples | d (mm) | D/d | Coiling property |
|---------|--------|-----|------------------|
| Example 1 | 1.0 | 6.0 | IV |
| Example 2 | 1.2 | 6.0 | III |
| Example 3 | 1.5 | 6.0 | I |
| Example 4 | 2.0 | 6.0 | I |
| Example 5 | 3.0 | 6.0 | I |
| Example 6 | 4.0 | 2.5 | IV |
| Example 7 | 4.0 | 3.0 | I |
| Example 8 | 4.0 | 6.0 | I |
| Example 9 | 4.0 | 8.0 | I |
| Example 10 | 5.0 | 6.0 | I |
| Example 11 | 7.0 | 6.0 | I |
| Example 12 | 9.0 | 6.0 | I |
| Example 13 | 10.0 | 6.0 | II |

Evaluation results of coiling property are also shown in Table 2. In Table 2, "I" means that the approximately circular coil spring could be produced without being abnormally deformed, "II" means that the approximately circular coil spring could be produced without being abnormally deformed but desired structure could not be obtained around a central part of a cross section of the wire material, "III" means that the coil spring could be produced (cutting by the cutting blade was possible) but buckling of wire material was slightly generated during coiling and abnormally deformed coil spring was produced, and "IV" means that buckling of wire material was generated during coiling thereby detaching the wire material from the wire guide or coiling tool and the coil spring could not be produced.

As is obvious from Table 2, coiling property is different depending on combination of wire diameter d and spring index D/d. In particular, in the case in which the wire diameter d is 1.5 to 9.0 mm, the coiling property was good in a range of the spring index D/d of 3 to 8. Furthermore, it is considered that heating was not sufficiently performed until the austenite region around a central part in Example 13 due to the structure and hardness. It is suggested that this is caused by thickness of the wire diameter d, and uniform heating over the entirety of the inside of the wire material is difficult in the case in which the wire diameter is 10 mm or more in the desired short time heating. However, the structure around the central part in the Example 13 is limited within a diameter of about 2 mm from the wire material center, that is, since almost no stress is applied to the range when using as the coil spring, there is practically no problem as a coil spring.

It should be noted that the samples whose coiling property was I, II, and III were quenched by oil at 60° C. in a condition in which temperature of the samples after cutting and being separated was still in the austenite region. Residual stress in the wire axis direction at an inner diameter side of the coil springs after quenching was measured. The measurement of the residual stress was performed by using X-ray diffraction type residual stress measuring apparatus (produced by Rigaku Corporation) in a condition of a tube: Cr and collimator diameter: 0.5 mm.

As a result, residual stress in the wire axis direction was in a range of −75 to 50 MPa in all of the samples, and thus residual stress by processing was restrained. In addition, as a comparison, residual stress of a coil spring (material the same as in Table 1, d=4.0 mm, D/d=6.0) that had been coiled by the cold forming was measured, and the residual stress in the wire axis direction at an inner diameter side of the coil was 750 MPa. This result also indicates that residual stress by processing can be prevented from being generated by the hot forming.

Evaluation of Fatigue Resistance

Next, samples of coil spring were produced by each of the production processes, and fatigue resistance was evaluated. First, hard drawn wire and oil temper wire having chemical components shown in Table 3 and having wire diameter of 4.1 mm were prepared. Using these hard drawn wires and oil tempered wires, coil springs having a spring index 6, pitch angle of effective part 9°, and number of turns of effective part 3.25 were produced according to production processes shown in FIGS. 1A to 1D (hereinafter each of them are referred to as production processes A to D) by the hot forming method or cold forming method.

In the hot forming method of the production process A, the steel wire was heated to 900° C. by the coiling machine (see FIGS. 2 and 3) having the high frequency heating coil, coiled, and then quenched by oil at 60° C. After that, tempering treatment was performed in conditions shown in Table 4 (Inventive Examples 1 to 8, Comparative Examples 1 and 4). Furthermore, in the cold forming method of the production process B, after coiling, annealing treatment was performed in conditions shown in Table 4 (Comparative Examples 2 and 5).

In the cold forming method of the production process C, after coiling, annealing treatment was performed in conditions shown in Table 4 and then nitriding treatment was performed. In the nitriding treatment, a hardened layer having a depth of 0.04 mm was formed at the surface of the wire material (Comparative Example 6). Furthermore, in the cold forming method of the production process D, after coiling, the coil spring was heated until 900° C. at temperature increasing rate of about 30° C./min by a heating furnace, was maintained at the temperature for 5 minutes, and was then quenched by oil at 60° C. After that, tempering treatment was performed in conditions shown in Table 4 (Comparative Example 3).

Next, shotpeening treatment and setting treatment were performed in each of the samples. In the shotpeening treatment, a first shotpeening treatment by steel round cut wire having sphere-equivalent diameter 1.0 mm, a second shotpeening treatment by steel round cut wire having sphere-equivalent diameter 0.5 mm, and a third shotpeening treatment by steel beads having sphere-equivalent diameter 0.1 mm were performed in this order. As a setting, hot setting was performed in condition of heating temperature of coil spring of 200° C. and load stress of 1500 MPa.

TABLE 3

| Symbol | C | Si | Mn | Cr | V | Ni | Note (wt %) |
|---|---|---|---|---|---|---|---|
| A | 0.82 | 0.24 | 0.55 | — | — | — | Hard drawn wire |
| B | 0.47 | 0.28 | 0.82 | 0.95 | 0.021 | — | Hard drawn wire |
| C | 0.58 | 1.49 | 0.69 | 0.71 | — | — | Hard drawn wire |
| D | 0.55 | 1.44 | 0.66 | 0.73 | — | — | Oil tempered wire |
| E | 0.61 | 2.06 | 0.74 | 1.00 | 0.09 | 0.21 | Oil tempered wire |

TABLE 4

| Samples | Material | Production process | Tempering temperature | Annealing temperature |
|---|---|---|---|---|
| Inv. Example 1 | A | A | 450° C. | — |
| Inv. Example 2 | B | A | 150° C. | — |
| Comp. Example 1 | C | A | 200° C. | — |
| Inv. Example 3 | C | A | 250° C. | — |
| Inv. Example 4 | C | A | 300° C. | — |
| Inv. Example 5 | C | A | 350° C. | — |
| Inv. Example 6 | C | A | 400° C. | — |
| Comp. Example 2 | C | B | — | 400° C. |
| Comp. Example 3 | C | D | 400° C. | — |
| Comp. Example 4 | C | A | 435° C. | — |
| Inv. Example 7 | D | A | 400° C. | — |
| Inv. Example 8 | E | A | 435° C. | — |
| Comp. Example 5 | E | B | — | 435° C. |
| Comp. Example 6 | E | C | — | 400° C. |

As explained below, several properties of these samples obtained as above were tested. The results are shown in Table 5.

(1) Hardness (HV)

Using a Vickers hardness testing machine (trade name: FM-600, produced by Future Tech Corporation) and setting measured load at 200 gf, hardness was measured at freely selected five points on the circumference of a circle of d/4 of cross section of central part in height direction of the coil spring, and the average thereof was calculated.

(2) Compressive Residual Stress ($-\sigma_{R0.2}$) of Depth of 0.2 Mm, Compressive Residual Stress ($-\sigma_{R0.4}$) of Depth of 0.4 mm, Maximal Compressive Residual Stress ($-\sigma_{Rmax}$), Compressive Residual Stress Integrated Value ($L_{oR}$), and Crossing Point (CP)

Figure 4:
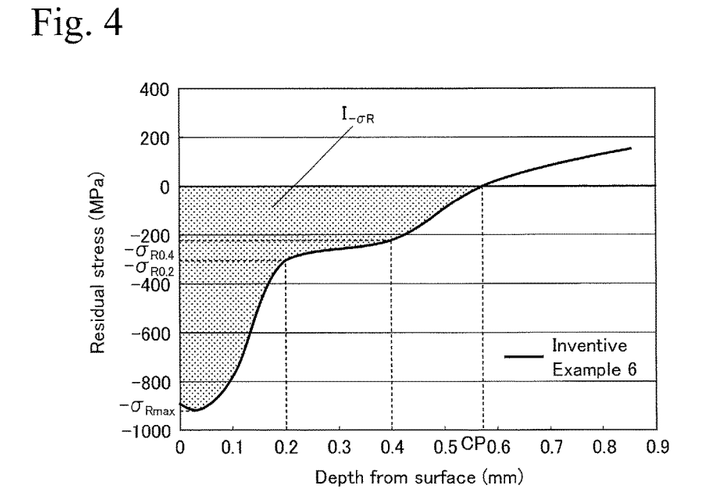
FIG. 4 is a graph showing residual stress distribution in a coil spring used in Example.

In the surface of wire material at an inner diameter side of the coil spring, compressive residual stress of the +45° direction relative to the wire axis direction of the wire material (approximate maximal main stress direction in a case in which compressive load is loaded on the spring) was measured by using an X-ray diffraction type residual stress measuring device (produced by Rigaku Corporation). The measurement was performed by setting tube; Cr, and collimator diameter: 0.5 mm. In addition, the above-mentioned measurement was again performed after chemical polishing of the entire surface of the wire material of the coil spring using hydrochloric acid, and by repeating this process, residual stress distribution in depth direction was measured. Depending on the results, the unloaded compressive residual stress at depth of 0.2 and 0.4 mm from the surface, maximal compressive residual stress, and crossing point were calculated. Furthermore, the compressive residual stress integrated value was calculated by integrating the compressive residual stress from the surface to the crossing point in the relationship diagram of depth and residual stress. It should be noted that the residual stress distribution of Inventive Example 6 is shown in FIG. 4 for example.

(3) Prior γ Particle Average Crystal Particle Size (G)

As a pretreatment, a sample of coil spring was heated at 500° C. for 1 hour. Furthermore, at the position of d/4 of cross section of the coil spring, setting number of visual field at 10 positions and magnification 1000 times, measurement was performed according to JIS G0551 using an optical microscope (trade name ME600, produced by NIKON), so as to calculate the prior γ particle average crystal particle number G (4) Surface Roughness ($R_z$ (Maximal Height))

Using a non-contact three-dimensional shape measuring device (trade name: NH-3, produced by MITAKA), the surface roughness was measured according to JIS B0601. The measurement conditions were as follows, measuring magnification: 100 times, measuring distance: 4 mm, measuring pitch: 0.002 mm, and cut off value: 0.8 mm.

(5) Average Crystal Particle Diameter ($d_{GS}$)

By the FE-SEM/EBSD (Electron Back Scatter Diffraction) method, using JEOL J SM-7000F (TSL solutions OIM-Analysis Ver. 4.6), average crystal particle diameter was measured. Here, the measurement was performed at depth of 0.1 mm from the surface on a cross section of wire material of the coil spring, IPF Map was made by setting observation magnitude 10000 times, azimuth angle difference of 5° or more was regarded as a particle interface, and the average crystal particle diameter was calculated.

(6) Fatigue Resistance (Breakage Ratio)

The fatigue test was performed by using a hydraulic servo type fatigue testing machine (produced by Saginomiya Seisakusho, Inc.) at room temperature (in air). The fatigue resistance was evaluated based on breakage ratio (number of breaks/number of tests) after applying oscillation of 20,000,000 times, in the following test conditions, testing stress: 735±637 MPa, frequency: 20 Hz, and number of test pieces: 8 in each.

Therefore, the hardness is desirably 570 to 700 HV in the present invention, and more desirably 570 to 690 HV.

(2) Residual Stress Distribution

The Inventive Examples 6 and 7 which were produced by the hot forming method have similar composition, and compared to Comparative Example 2 in which the heat treatment was performed at similar temperature, they have large compressive residual stress at a position deep from the surface ($-\sigma_{R0.4}$). This is considered to mean that tensile residual stress, which is generated in cold coiling (remaining at an inner diameter side of the coil) is generated only slightly in hot coiling. That is, compared to Comparative Example 2 in which tensile residual stress is generated by cold coiling, it is understood that compressive residual stress by shotpeening may easily enter deeper from the surface in Inventive Examples 6 and 7.

Regarding Inventive Examples 1 to 8, $-\sigma_{Rmax}$ was 850 MPa or more, $I_{-\sigma R}$ was 180 MPa·mm or more, and CP was 0.45 mm or more. Thus, deep and large compressive residual stress was obtained and fatigue resistance was superior. As a result of observation of broken edges of the broken pieces of Comparative Examples 2 to 5, the origin of breaking was in depths range of 0.15 to 0.35 mm from the surface, and were inner origin points which started from non-metal inclusions as an origin point. This depth corresponds to the vicinity of the region in which maximal value of combined stress (applied stress-residual stress) is exhibited, and it is understood that a larger compressive residual stress in the region ($-\sigma_{R0.2}$ and $-\sigma_{R0.4}$ as an index) is important to improve fatigue resistance. Therefore, in Inventive Examples 1 to 8 in which $-\sigma_{R0.2}$ is 200 MPa or more and $-\sigma_{R0.4}$ is 100 MPa or more, almost similar fatigue strength to Comparative Example 6 in which expensive wire material including expensive elements was used and nitriding treatment was performed, or larger fatigue strength, can be obtained.

TABLE 5

| Sample | HV | $-\sigma_{R0.2}$ (MPa) | $-\sigma_{R0.4}$ (MPa) | $-\sigma_{Rmax}$ (MPa) | $I_{-\sigma R}$ (MPa · mm) | CP (mm) | G | Rz (μm) | $d_{GS}$ (μm) | Breakage ratio |
|---|---|---|---|---|---|---|---|---|---|---|
| Inv. Example 1 | 575 | 326 | 242 | 855 | 181 | 0.55 | 10.5 | 9.2 | 0.95 | 1/8 |
| Inv. Example 2 | 654 | 262 | 197 | 975 | 188 | 0.51 | 11.8 | 6.97 | 0.95 | 0/8 |
| Comp. Example 1 | 705 | 164 | 88 | 1212 | 217 | 0.45 | 11.1 | 5.22 | 0.9 | 6/8 |
| Inv. Example 3 | 695 | 205 | 102 | 1180 | 212 | 0.47 | 11.3 | 5.46 | 0.91 | 3/8 |
| Inv. Example 4 | 685 | 222 | 117 | 1145 | 204 | 0.48 | 12.1 | 5.74 | 0.87 | 1/8 |
| Inv. Example 5 | 662 | 248 | 185 | 1087 | 192 | 0.52 | 11.8 | 6.72 | 0.94 | 0/8 |
| Inv. Example 6 | 584 | 305 | 221 | 911 | 183 | 0.57 | 11.2 | 8.33 | 0.91 | 1/8 |
| Comp. Example 2 | 592 | 311 | −175 | 924 | 144 | 0.28 | 12.6 | 8.72 | 0.89 | 8/8 |
| Comp. Example 3 | 595 | 297 | 207 | 945 | 187 | 0.55 | 9.5 | 8.11 | 0.97 | 8/8 |
| Comp. Example 4 | 555 | 337 | 252 | 842 | 171 | 0.6 | 11.7 | 10.86 | 0.95 | 8/8 |
| Inv. Example 7 | 592 | 298 | 214 | 923 | 186 | 0.57 | 13.2 | 8.21 | 0.73 | 0/8 |
| Inv. Example 8 | 597 | 288 | 215 | 933 | 187 | 0.58 | 13.9 | 8.14 | 0.72 | 0/8 |
| Comp. Example 5 | 587 | 284 | −135 | 930 | 149 | 0.35 | 12.4 | 8.66 | 0.92 | 5/8 |
| Comp. Example 6 | 608 | 254 | −124 | 1620 | 158 | 0.33 | 12.1 | 5.9 | 0.79 | 2/8 |

(1) Hardness

As is obvious from Table 5, in the present invention based on the hot forming method, high fatigue resistance can be obtained in the case in which the hardness is 570 to 700 HV. Furthermore, it is more desirable that the hardness be 570 to 690 HV Compressive residual stress in the depth of 0.1 to 0.4 mm, which may be an origin of breaking, can be sufficiently obtained if the hardness is within these ranges. Therefore, it is considered that high fatigue resistance can be obtained by preventing an inner origin point from being broken. Furthermore, from the results of Comparative Example 4, sufficient fatigue resistance cannot be obtained in the case in which the hardness is less than 570 HV, even if the coil spring is produced by the hot forming method.

It should be noted that Comparative Example 1 was also produced by the hot forming method; however, since tempering temperature was too low, the hardness became high over 700 HV, and compressive residual stress was difficult to enter deep from the surface. Comparative Example 1 has high notch sensitivity since hardness is high and toughness is poor, and fatigue resistance is low since $-\sigma_{0.2}$ and $-\sigma_{R0.4}$ are small. Furthermore, Comparative Example 4 had low hardness since tempering temperature was too high, and $-\sigma_{R0.2}$ and $-\sigma_{R0.4}$ were large values; however, certain $-\sigma_{Rmax}$ and $I_{-\sigma R}$ could not be obtained and fatigue resistance was low.

From these results, compared to a conventional method for production of coil springs (cold forming method), by the method for production of the coil spring of the present invention (hot forming method), it was confirmed that by appropriately setting tempering temperature to obtain a certain hardness, large compressive residual stress deep from the surface can be obtained, and thus, fatigue resistance can be improved.

(3) Prior γ Particle Average Crystal Particle Size

In Inventive Examples 1 and 3 to 7 consisting of simple composition of materials A, C or D, the value of G was 10 or more, which corresponds to almost same fine crystal particle of Comparative Examples 5 and 6 in which expensive steel (amount of V having effect of miniaturization of crystal particle is large) was used. On the other hand, in Comparative Example 3 that was thermally refined by furnace heating after the cold forming, the G was 9.5, which indicates coarsened crystal particles. The reason fine crystal particles were obtained in spite of using material consisting of simple composition is that rapid heating was performed by the high frequency heating. That is, heating in a short time by the high frequency heating was conducive to preventing prior austenite particles from being coarsened, or conducive to miniaturization of the particles. As a result, in Inventive Examples 1 and 3 to 7 consisting of a simple composition, fine crystal particles having G of 10 or more and superior fatigue resistance could be obtained.

(4) Surface Roughness

Regarding Inventive Examples 1 to 8 in which there was high fatigue resistance, the surface roughness $R_z$ (maximal height) was 9.5 μm or less, and the desired roughness $R_z$ of 20 mm or less is sufficiently satisfied. Here, in a case in which $R_z$ is more than 20 μm, concave parts of the surface roughness may become sources at which stress concentrates, cracking may be generated and spread from the concave parts as origin points, and this may result in premature breakage. Furthermore, this surface roughness is formed by friction with tools during coiling, and by shotpeening treatment. The surface roughness formed by shotpeening treatment is determined by a combination of conditions such as hardness of the wire material, and particle diameter, hardness and injection rate of shot. Therefore, in view of hardness of the wire material, the condition of shotpeening should be set so as not to exceed $R_z$ of 20 μm.

(5) Average Crystal Particle Diameter

In Inventive Examples 1 and 3 to 7 consisting of simple composition of material A, C or D, the value of $d_{Gs}$ was 0.73 to 0.95 and average crystal particle diameter was almost the same as that in Comparative Examples 5 and 6 in which expensive steel was used. The reason is that, as already mentioned above, the short time of heating by the high frequency heating conduced to prevent the structure from being coarsened or conduced miniaturization, and as a result, fine average crystal particle diameter and improved fatigue resistance were obtained in Inventive Examples 1 and 3 to 7.

There was a problem in dimensional accuracy in Comparative Example 3 that was produced by the production process D. For example, the standard deviation of coil diameter that was evaluated for fifty coil springs after they were tempered, was 0.072 mm, and this could not satisfy the standard deviation of 0.05 mm or less which is required for valve springs or clutch torsion springs. This is because large processing strain remained in the coil spring after the cold forming, and the processing strain was not distributed uniformly in one coil spring, and in addition, there was variation in processing strain among multiple coil springs. By heating at an austenite region and quenching this coil spring, thereby resulting in non-uniform deformation, which is accompanied by loosening of processing strain and transformation stress, that is, there was variation in the shapes. On the other hand, the standard deviation of coil diameter was 0.035 mm at the most in samples other than Comparative Example 3, thereby having sufficient process capability.

As explained so far, by the method for production of the compression coil spring of the present invention, a compression coil spring having superior fatigue resistance to that of a conventional cold-formed spring in which expensive steel is used can be produced, even using inexpensive wire material.

The invention claimed is:

1. A compression coil spring comprising a coiled steel wire material, the steel wire material consisting of:
   C: 0.45 to 0.85 mass %,
   Si: 0.15 to 2.5 mass %,
   Mn: 0.3 to 1.0 mass %, and
   Fe and inevitable impurities as a remainder,
   wherein:
      hardness of a freely selected cross-section of the steel wire material is 570 to 700 HV,
      at an inner diameter side of the coil spring, unloaded compressive residual stress at a depth of 0.2 mm from a surface in an approximate maximal main stress direction in a case in which compressive load is loaded on the spring is 200 MPa or more, and unloaded compressive residual stress at a depth of 0.4 mm from the surface is 100 MPa or more, and
      the steel wire material has a circle-equivalent diameter of 1.5 to 9.0 mm and a structure consisting of tempered martensite.

2. The compression coil spring according to claim 1, wherein at an inner diameter side of the coil spring, unloaded maximal compressive residual stress is 850 MPa or more.

3. The compression coil spring according to claim 1, wherein the compression coil spring has a spring index between 3 to 8.

4. The compression coil spring according to claim 1, wherein surface roughness $R_z$ (maximal height) is 20 μm or less.

5. A method for producing the compression coil spring of claim 1, the method comprising, in this order:
   coiling the steel wire material into a coil using an apparatus comprising:
      a feed roller configured to continuously supply the steel wire material,
      a wire guide configured to guide the position of the steel wire material supplied by the feed roller, and
      a coiling tool comprising a coiling pin or a coiling roller and configured to form the steel wire material guided by the wire guide into a coil,
   heating the coil to an austenite region temperature within 2.5 seconds between the feed roller and the coiling tool,
   quenching the coil from the austenite region temperature,
   tempering the coil to thermally refine the coil,
   performing a shotpeening treatment to impart a compressive residual stress to a surface of the steel wire material, and
   performing a setting treatment of the steel wire material, to form the compression coil spring.

6. The method for producing the compression coil spring according to claim 5, wherein:
   the apparatus further comprises a high-frequency heating coil that is arranged so as to be concentric with the steel wire material when the steel wire material passes inside of the wire guide, or when the steel wire material passes through a space between the wire guide and the coiling tool, and the heating is performed using the high-frequency heating coil.

7. A compression coil spring comprising a coiled steel wire material, the steel wire material consisting of:
C: 0.45 to 0.85 mass %,
Si: 0.15 to 2.5 mass %,
Mn: 0.3 to 1.0 mass %, and
Fe and inevitable impurities as a remainder,
wherein:
hardness of a freely selected cross-section of the wire material is 570 to 700 HV,
at an inner diameter side of the coil spring, $I_{-\sigma R}$ is 180 MPa·mm or more, in a case in which a crossing point is a depth from a surface, where unloaded compressive residual stress value in an approximate maximal main stress direction in a case of compressive load is loaded on the spring becomes 0, and the $I_{-\sigma R}$ is an integral value of the unloaded compressive residual stress in a region from the surface to the crossing point, and
the steel wire material has a circle-equivalent diameter of 1.5 to 9.0 mm and a structure consisting of tempered martensite.

8. The compression coil spring according to claim 7, wherein at an inner diameter side of the coil spring, unloaded maximal compressive residual stress is 850 MPa or more.

9. The compression coil spring according to claim 7, wherein the compression coil spring has a spring index between 3 to 8.

10. The compression coil spring according to claim 7, wherein surface roughness $R_z$ (maximal height) is 20 μm or less.

11. A compression coil spring comprising a coiled steel wire material, the steel wire material consisting of:
C: 0.45 to 0.85 mass %,
Si: 0.15 to 2.5 mass %,
Mn: 0.3 to 1.0 mass %,
at least one of Cr, B, Ni, Ti, Cu, Nb, V, Mo, W: 0.005 to 4.5 mass %, and
Fe and inevitable impurities as a remainder,
wherein:
hardness of a freely selected cross-section of the wire material is 570 to 700 HV,
at an inner diameter side of the coil spring, unloaded compressive residual stress at a depth of 0.2 mm from a surface in an approximate maximal main stress direction in a case in which compressive load is loaded on the spring is 200 MPa or more, and unloaded compressive residual stress at a depth of 0.4 mm from the surface is 100 MPa or more, and
the steel wire material has a circle-equivalent diameter of 1.5 to 9.0 mm and a structure consisting of tempered martensite.

12. The compression coil spring according to claim 11, wherein the spring comprises Cr: 0.5 to 2.0 mass %.

13. The compression coil spring according to claim 11, wherein at an inner diameter side of the coil spring, unloaded maximal compressive residual stress is 850 MPa or more.

14. The compression coil spring according to claim 11, wherein the compression coil spring has a spring index between 3 to 8.

15. The compression coil spring according to claim 11, wherein surface roughness $R_z$ (maximal height) is 20 μm or less.

16. A compression coil spring comprising a coiled steel wire material, the steel wire material consisting of:
C: 0.45 to 0.85 mass %,
Si: 0.15 to 2.5 mass %,
Mn: 0.3 to 1.0 mass %,
at least one of Cr, B, Ni, Ti, Cu, Nb, V, Mo, W: 0.005 to 4.5 mass %, and
Fe and inevitable impurities as a remainder,
wherein:
hardness of a freely selected cross-section of the wire material is 570 to 700 HV,
at an inner diameter side of the coil spring, $I_{-\sigma R}$ is 180 MP·mm or more, in a case in which a crossing point is a depth from a surface, where unloaded compressive residual stress value in an approximate maximal main stress direction in a case of compressive load is loaded on the spring becomes 0, and the $I_{-\sigma R}$ is an integral value of the unloaded compressive residual stress from the surface to the crossing point, and
the steel wire material has a circle-equivalent diameter of 1.5 to 9.0 mm and a structure consisting of tempered martensite.

17. The compression coil spring according to claim 16, wherein at an inner diameter side of the coil spring, unloaded maximal compressive residual stress is 850 MPa or more.

18. The compression coil spring according to claim 16, wherein the spring comprises Cr: 0.5 to 2.0 mass %.

19. The compression coil spring according to claim 16, wherein the compression coil spring has a spring index between 3 to 8.

20. The compression coil spring according to claim 16, wherein surface roughness $R_z$ (maximal height) is 20 μm or less.

* * * * *